C. B. DARROW.
Evaporating Pan.

No. 40,460

Patented Nov. 3, 1863.

Witnesses:
J. W. Coombs.
M. M. Livingston.

Inventor:
C. B. Darrow,
per Munn & Co.
Attys.

UNITED STATES PATENT OFFICE.

C. B. DARROW, OF ORLAND, INDIANA.

IMPROVEMENT IN PANS FOR EVAPORATING SUGAR, &c.

Specification forming part of Letters Patent No. 40,460, dated November 3, 1863.

*To all whom it may concern:*

Be it known that I, C. B. DARROW, of Orland, in the county of Steuben and State of Indiana, have invented a new and Improved Sugar-Pan; and I do hereby declare that the following is a full, clear, and exact description of the same, reference being had to the accompanying drawings, forming a part of this specification, in which—

Figure 1:
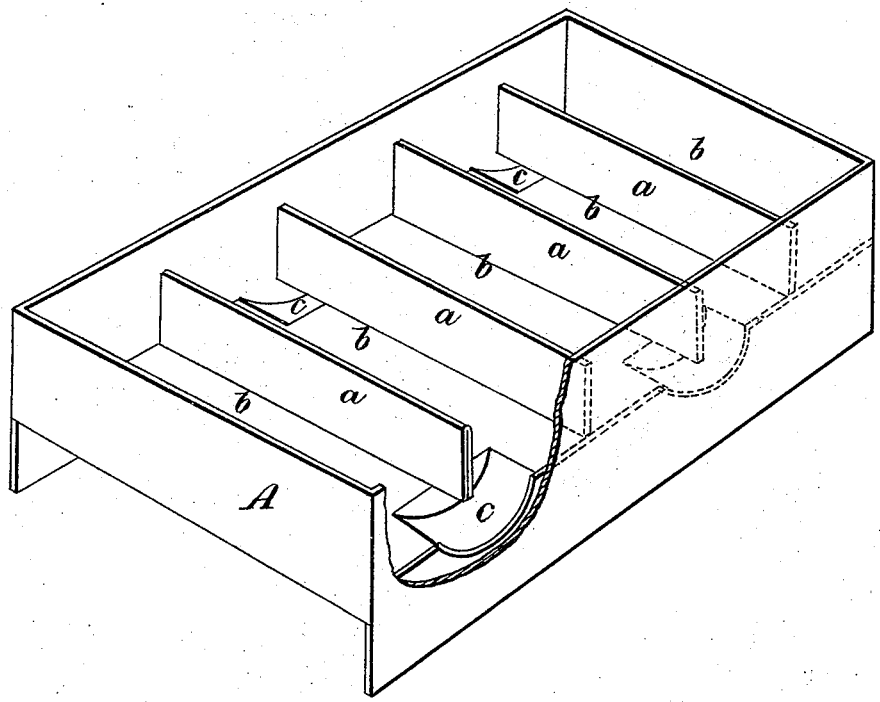
Figure 2:
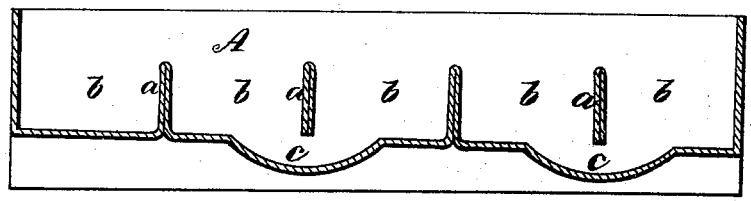

Figure 1 represents a perspective view of my invention, a portion of the side of the pan being broken away to expose the interior. Fig. 2 is a longitudinal vertical section of the same.

Similar letters of reference in both views indicate corresponding parts.

This invention consists in the arrangement of cavities on the opposite sides of the pans and under the ends of the several partitions, alternately at one end and then at the opposite end, in such a manner that the scum rising in one compartment or groove is not allowed to pass into the next compartment without interrupting the current of the juice from one end of the pan to the other, and at the same time the sediment forming at the bottom of the passages between the compartments is not allowed to interrupt the current of sirup, neither is it permitted to mix with the sirup and to impede the granulation of the sugar.

To enable those skilled in the art to make and use my invention, I will proceed to describe it.

A represents a pan, made of sheet metal or of any other suitable material or materials in the ordinary manner, with four sides, and of any desired capacity. This pan is divided by transverse partitions *a* into a series of compartments, *b*, and said partitions extend from one side of the pan clear through to the other. The communication between the several compartments is effected by means of cavities *c*, one at one end of each partition, and alternately at opposite sides of the pan. By these cavities semicircular channels are formed under one of the ends of each partition, so that the juice from one compartment can readily pass into the other. The scum, however, and such impurities which rise to the surface have no chance to pass from one compartment to the other, and can be readily removed. Furthermore, in passing through the openings in the partitions of ordinary evaporators the juice is liable to deposit a sediment, which must be removed by scrubbing at short intervals, in order to prevent it from burning to the bottom, and so serious is this difficulty that the scrubbing must be repeated every half-hour while the pan is in full heat, and even then the sediment, when chased through all the compartments, will flow out of the pan with the sirup and impair its quality. In my pan the sediment accumulates in each compartment, and when scrubbed loose either rises as scum, and may thus be skimmed off at the lower end of the compartment, or it precipitates in the cavity under the partition, where it may remain without injury for several hours until it accumulates to such a degree that it impedes the flow of the juice, when it must be taken out with a small scoop, while the current is stopped temporarily by a piece of board with cloth covering the upper half of the cavity. By this arrangement the sediment is perfectly removed, and not allowed to mingle with the sirup. By the use of my pan, therefore, considerable labor is saved, and besides this a much better article and a larger percentage of sirup is produced than with a pan of the ordinary construction.

What I claim as new, and desire to secure by Letters Patent, is—

A sugar-pan provided with cavities *c* at or under the alternating ends of the partitions *a*, substantially as and for the purpose shown and described.

C. B. DARROW.

Witnesses:
E. M. ROBERTS,
R. N. PURDY.